3,064,054
PREPARATION OF ORGANOBORON COMPOUNDS
Herbert Jenkner, Hannover-Wulfel, Germany, assignor to Kali-Chemie Aktiengesellschaft, Hannover, Germany
No Drawing. Filed Nov. 14, 1960, Ser. No. 68,590
Claims priority, application Germany Nov. 13, 1959
10 Claims. (Cl. 260—606.5)

The invention relates to the prepartion of organoboron compounds.

In my co-pending application Ser. No. 53,368, filed September 1, 1960, for Preparation of Boranes, I have disclosed and claimed the reaction of organic silicon hydride with boron halide compounds, which produces boranes and organosilicon halogen hydrides. In my further investigations, I found, that instead of boranes, organoboron compounds are obtained if the reaction is carried out in the presence of unsaturated organic compounds, according to the equation (1) $3R_2SiH_2 + 2BCl_3 + 6C_nH_{2n} \rightarrow 3R_2SiCl_2$
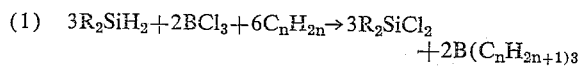
$+ 2B(C_nH_{2n+1})_3$ The process is preferably carried out as a cycle process where the obtained organosilicon halides are reconverted to the original organosilicon hydrides according to the process disclosed in my co-pending application Ser. No. 693,257, filed October 30, 1957, now U.S. Patent No. 2,043,857, for Preparation of Hydrides of the Fourth and Fifth Group Elements by means of alkali metal hydride activated by compound of the formula $MR_xR'_y$, wherein M is a member of the group consisting of boron, gallium, and aluminum, $x$ is an integer from 1 to 3 and $x+y=3$, R is a member of the group consisting of lower alkyl, lower alkoxy, and phenoxy and R' is a member of the group consisting of hydrogen and halogen. In this recycling process, the organosilicon hydrides act essentially only as hydrogen transfer agents while the hydrogen is furnished by the alkali metal hydride.

From a combination of Equation 1 with equation (2) $3R_2SiCl_2 + 6NaH \rightarrow 3R_2SiH_2 + 6NaCl$ it will be seen that the organoboron compound is prepared from the alkali metal hydride, the unsaturated organic compound and the boron halide compound as follows:

(3) $6NaH + 2BCl_3 + 6C_nH_{2n} \rightarrow 2B(C_nH_{2n+1})_3 + 6NaCl$

In most cases, it is advisable to operate in the atmosphere of a protecting gas at normal pressure. When low boiling olefins are employed, I prefer to use elevated pressures. The reaction takes place preferably at temperatures of 40 to 140° C. but lower or higher temperatures may also be used.

Normally, it is not necessary to use a solvent or diluent; but for the preparation of solid organoboron compounds, it is of advantage to employ an indifferent solvent such as ethers, hexane, or the like.

Organosilicon compounds useful for the reaction are compounds which contain hydrogen and at least one organic radical attached to silicon. They may be mono-, di-, or triorganosilicon tri-, di-, or monohydrides, which may be substituted.

Alkyl as well as aryl silicon hydrides may be used. I prefer to use silicon hydrides where the organic group has a low number of carbon atoms, such as mono-, di-, and triethyl silanes, mono- and dipropyl silane, monobutyl silane, and monophenyl silane.

Inorganic silanes, such as $SiH_4$, $SiH_2Cl_2$, and the like may be used in place of the recited organosilicon compounds.

Suitable boron halide compounds are compounds which contain at least one boron-halogen linkage, particularly the boron chlorides. In addition to boron trihalides, also diorganoboron halides and organoboron dihalides may be used, whereby the organo groups may be alkyl or aryl. Also organic addition compounds of the boron halides, such as the etherates or aminates, may be employed. I prefer the chlorides but other halides such as the bromides may be used.

A great number of unsaturated organic compounds may be used for the reaction. Suitable compounds are particularly linear and cyclic olefins having one or several double bonds, and compounds having a triple bond i.e., acetylenic hydrocarbons. Such compounds may also be partially substituted, for instance by chlorine. Of course, substituents like hydroxyl or carboxyl, which react with the starting or end products of the reaction, must not be attached to the unsaturated organic compound.

In carrying out the reaction, it must be endeavored to convert the organosilicon hydride to an organosilicon halide which is readily separated from the organoboron end product. Therefore, it is frequently of advantage to operate with an excess of organosilicon hydride, thereby replacing only part of the hydrogen atoms bound to silicon by halogen bound to boron. For instance, the reaction of diethyl silane in excess with boron trichloride and propylene can be directed in such a way that only one hydrogen atom of the diethyl silane is replaced by chlorine to produce, in addition to boron tripropyl, diethyl monochlorosilane, which is separated from the boron tripropyl easier than diethyl dichlorosilane.

The composition of the end product may also be influenced by using an excess or less than the stoichiometric amount of the other reactants. For instance, by using less than the stoichiometric amount of olefin, an alkylboron hydride compound is obtained; with an excess of boron trichloride, alkylboron chloride is formed, which may be again reacted with the organosilicon hydride and olefin.

If it is desired to obtain pure boron alkyl compounds, such as pure boron trialkyls, it is of advantage to use an excess of the unsaturated organic compound and of the silicon-hydrogen compound.

The smooth course of the reaction according to Equation 1 is all the more surprising as it was known that olefins polymerize to resinous products in the presence of boron chloride. Only in the presence of organosilicon hydride, the organoboron compounds are produced, whereby yields of more than 90 percent can be obtained.

The following examples illustrate the invention. All parts are given by weight, unless indicated otherwise.

Example 1

In a nitrogen atmosphere, 100 parts of boron trichloride were slowly added with stirring to a solution of 348 parts of triethylsilane in 370 parts of cyclohexene at a temperature of 40 to 75° C. The boron trichloride reacted at once quantitatively. After the addition of boron trichloride had been terminated, the solution was heated for two hours at a temperature of 80 to 120° C. under slightly elevated nitrogen pressure. Then the excess of cyclohexene and the formed triethyl chlorosilane were distilled off. Subsequently, 208 parts (more than 90 percent of theory) of boron tricyclohexyl were obtained by vacuum distillation, which at room temperature formed a white crystalline mass.

The distilled off mixture of cyclohexene-triethylchlorosilane (about 470 parts) was then reacted with 80 parts of activated sodium hydride; there was obtained a mixture of cyclohexene and triethylsilane, which, after further addition of cyclohexene, produced with boron trichloride again boron tricyclohexyl.

*Example 2*

83.6 parts of triethyl silane were added to 23.5 parts of 1.5-hexadiene, and the mixture was refluxed at about 80° C. Within 1 hour, there were introduced under a nitrogen atmosphere into the mixture 22.4 parts of boron trichloride which reacted at once quantitatively. The reaction mixture was heated for an additional half hour at about 80 to 90° C. under reduced pressure to distill off the easily volatilized components consisting of excess triethyl silane and formed triethyl chlorosilane. A colorless liquid remained, which was distilled at a boiling point of 134 to 135° C. and a pressure of $10^{-2}$ mm. Hg. There were obtained 24.2 parts (corresponding to a yield of more than 90 percent) of a compound having a molecular weight of 275 (calculated 274) and consisting of 73.3% C, 13.5% H, and 7.85% B.

According to the analysis, the compound was

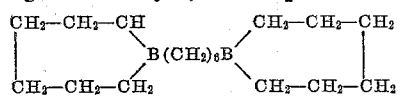

Oxidation and subsequent hydrolysis produced 1.5-hexane-diol, and reaction with glacial acetic acid produced hexane.

If the reaction was repeated under otherwise the same conditions but with an about 30 percent deficit of the hexadiene, a compound $(C_6H_{12}BH)_2$ was formed; an excess of boron trichloride produced the corresponding chloride $C_6H_{12}BCl$.

*Example 3*

30 parts of boron trichloride were introduced within two hours into a mixture of 120 parts of triethyl silane and 39.2 parts of phenyl acetylene heated at 80 to 90° C. The reaction started at once and proceeded exothermally with complete conversion of the boron trichloride. The originally water clear solution assumed first a yellow and then an orange red color. After the addition of the boron trichloride had terminated and after the reaction mixture had been heated for two additional hours at 120 to 180° C., the unreacted excess triethyl silane and the formed triethyl chlorosilane were distilled off in vacuo. As distillation residue, there remained 45 parts of an organoboron compound in the form of a clear dark red highly viscous liquid.

*Example 4*

13.6 parts of boron trichloride and an excess of acetylene were introduced at room temperature into 25.8 parts of triethyl silane. After quantitative conversion of the total boron trichloride, the easily volatile components were distilled off in vacuo. As residue, there remained 7.5 parts of an oily yellowish organoboron compound.

*Example 5*

A gas mixture consisting of 1 part by volume of monosilane, 4 parts by volume of ethylene, and 1 part by volume of boron trichloride was passed through a reaction tube partly filled with active carbon. The reaction was started at a temperature of 120 to 150° C. and maintained at a temperature of 140 to 190° C. The reaction was strongly exothermic and required intensive cooling of the reaction tube. The entire amount of the boron trichloride reacted with formation of ethylboron compounds. There were obtained 0.9 part by volume of gaseous boron triethyl, corresponding to a yield of 91 percent of theory.

I claim:

1. A process for the preparation of organoboron compounds comprising reacting a silicon hydride of the formula $SiH_xX_yY_z$, wherein X and Y are members of the group consisting of alkyl, aryl, and chlorine, $x$ is an integer from 1 to 4, $y$ and $z$ each are integers from 0 to 3, and $x+y+z=4$ with a boron halide compound selected from the group consisting of compounds of the formula $BHal_aR_{3-a}$, aminates thereof, and etherates thereof, wherein Hal is a member of the group consisting of chlorine and bromine, R is a member of the group consisting of alkyl and aryl, and $a$ is an integer from 1 to 3, in the presence of an unsaturated organic compound, selected from the group consisting of linear olefins, cyclic olefins, diolefins, polyolefins, acetylenic hydrocarbons, and partially chlorinated substitution products of said compounds.

2. A process as claimed in claim 1 wherein said silicon hydride is a lower alkyl silicon hydride.

3. A process as claimed in claim 1 wherein said boron halide compound is boron trichloride.

4. A process as claimed in claim 1 wherein the reaction is carried out at a temperature of 40 to 140° C.

5. A process as claimed in claim 1 wherein the reaction is carried out in a nitrogen atmosphere.

6. A process as claimed in claim 5 wherein the nitrogen is maintained at elevated pressure.

7. A process as claimed in claim 1 comprising employing the silicon hydride in such an excess that only part of the hydrogen atoms bound to the silicon atom are replaced by halogen.

8. A process for the preparation of organoboron compounds comprising reacting a silicon hydride of the formula $SiH_xX_yY_z$, wherein X and Y are members of the group consisting of alkyl, aryl, and chlorine, $x$ is an integer from 1 to 4, $y$ and $z$ each are integers from 0 to 3, and $x+y+z=4$ with a boron chloride compound selected from the group consisting of compounds of the formula $BHal_aR_{3-a}$, aminates thereof, and etherates thereof, wherein Hal is a member of the group consisting of chlorine and bromine, R is a member of the group consisting of alkyl and aryl, and $a$ is an integer from 1 to 3, and an olefin in an inert atmosphere at a temperature of about 40 to 140° C., separating the obtained organoboron compound from the formed silicon chloride, and reconverting said silicon chloride by means of activated sodium hydride to the original silicon hydride, the activator of the sodium hydride being a compound of the formula $MR_xR^1_y$, wherein M is a member of the group consisting of boron, gallium, and aluminum, $x$ is an integer from 1 to 3 and $x+y=3$, R is a member of the group consisting of lower alkyl, lower alkoxy, and phenoxy, and $R^1$ is a member of the group consisting of hydrogen and halogen.

9. A process as claimed in claim 1 wherein the reaction is carried out in the presence of substances with great surface areas.

10. The process as claimed in claim 9 wherein active carbon is employed as substance with great surface area.

No references cited.